Nov. 4, 1969  C. E. JONES ET AL  3,476,273

REFUSE COLLECTION VEHICLE

Filed July 26, 1967  2 Sheets-Sheet 1

INVENTORS.
CHARLES E. JONES
WILLIAM C. HENRY

BY *Seidel & Gonda*

ATTORNEYS.

INVENTORS.
CHARLES E. JONES
WILLIAM C. HENRY

BY Seidel & Gonda

ATTORNEYS.

United States Patent Office 3,476,273
Patented Nov. 4, 1969

3,476,273
REFUSE COLLECTION VEHICLE
Charles E. Jones, 1040 S. Trooper Road, Norristown, Pa. 19401, and William C. Henry, Wilmington, Del.; said Jones assignor of twenty-five percent to Thru-Way Equipment Company, Conshohocken, Pa., a corporation of Pennsylvania
Filed July 26, 1967, Ser. No. 656,286
Int. Cl. B60p 1/00; B65f 1/14; B60k 25/06
U.S. Cl. 214—82   9 Claims

ABSTRACT OF THE DISCLOSURE

A refuse collection vehicle having a packer in its body, and control means responsive to transmission speed selection which enables actuation of the packer when the speed selector of the vehicle transmission is set in neutral or high drive range position. When the packer is operated with the transmission in neutral, the control means causes engine speed-up so that adequate pressure is available to the packer.

---

This invention relates to refuse collection vehicles, and more particularly, to refuse collection vehicles of the type having packers therein.

Refuse collection vehicles wherein power is taken from the vehicle engine to drive a packer mechanism are not per se new. Thus, for example, in Patent 3,257,012, a hand-lever controlled mechanical power take-off was shown as a means for providing power for a packer mechanism. The problem with known prior art apparatus of the foregoing type is likelihood of damage to the hydraulic components of the packer mechanism with increased engine speed. Operation of the packer while the vehicle is in motion is especially hazardous in this regard. Mechanical damage is likely when the engine, driving the vehicle wheels through a high gear ratio, causes the hydraulic pump to exceed the design pressure of the various hydraulic components. The present invention provides apparatus whereby hydraulic overload is effectively avoided while maximum flexibility of operation is achieved.

The present invention is intended for use with vehicles having automatic transmissions of the type which provide at least a neutral range, a low or "1–2" range, and a high or "3–4" range. The invention effectively eliminates the danger of excessive hydraulic pressures by permitting operation of the packer only when the transmission is in ranges wherein engine speed is not so high as to drive the hydraulic pump to overload. To this end, a system is provided wherein a hydraulic pump, driven by a power take-off from the transmission, drives fluid through a normally open relief valve and back to a reservoir. An electro-mechanical control circuit is provided whereby placing of the transmission in its neutral range, and actuation of a manual control switch, causes the relief valve to move to a position wherein fluid under pressure is fed to a hydraulic actuator for the packer. The size of the pump is such that the engine provides insufficient fluid, however, at normal idle. Accordingly, a solenoid is provided whereby closing of the manual switch while the transmission is in neutral results in an increase in engine speed to the extent needed to provide proper hydraulic pressure. Also, a switch is provided whereby shifting of the transmission to the high range enables closing of the relief valve to provide pressure for the packer. No provision is made, however, for the closing of the relief valve when the transmission is in the low range. It is in the low range, wherein the speed reduction between engine and vehicle drive wheels is greatest, that overloading of the pump is a considerable danger. With operation of the relief valve limited to the high range, upshift and consequent decrease in engine speed prevent overspeeding of the pump.

Accordingly, it is an object of the present invention to provide a novel vehicle and packer unit.

It is another object of the present invention to provide a vehicle and packer wherein damage due to hydraulic overload is avoided.

It is still another object of the present invention to provide an apparatus whereby a vehicle mounted packer may be safely operated while the vehicle is in motion.

It is another object of the present invention to provide a packer drive unit for vehicles with automatic transmissions.

It is a further object of the present invention to provide a vehicle and packer unit wherein the packer may be operated only when the vehicle transmission speed selector is in specified positions.

It is a further object of the present invention to provide a vehicle and packer unit wherein the packer may be operated from within or without the vehicle.

It is yet another object of the present invention to provide a vehicle and packer unit including a control system for the packer wherein operation of the packer when the vehicle transmission is in neutral automatically increases vehicle engine speed to provide adequate fluid pressure.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
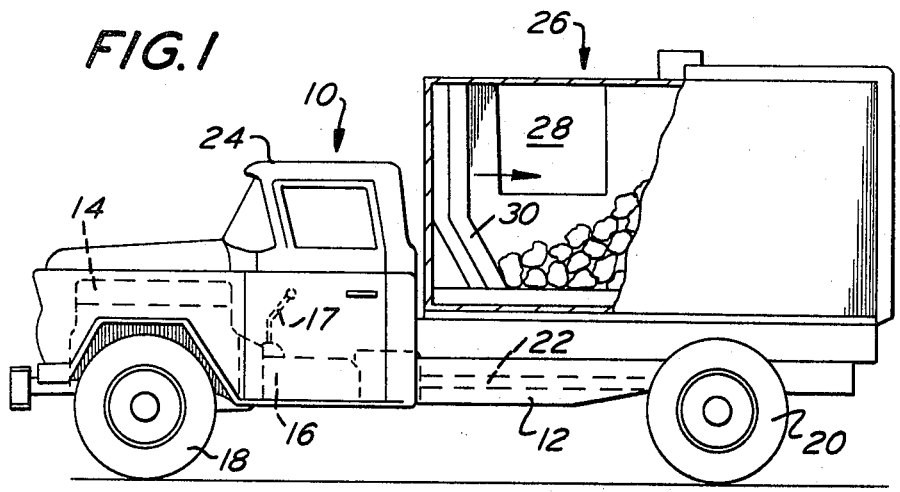
FIGURE 1 is a side elevational view, partially cut away, showing the general arrangement of a vehicle incorporating the present invention.

Referring now to the drawings in detail, wherein like numerals indicate like elements, there is seen in FIGURE 1 a vehicle indicated generally by the reference numeral 10. The vehicle 10 includes a chassis 12, to which an engine 14 and transmission 16 are secured. The transmission 16 includes a shift lever 17 whereby it may be selectively placed in neutral, low and high ranges. The chassis 12 is supported by front and rear wheels 18 and 20. A drive shaft 22 interconnects the transmission and a final drive, not shown, coupled to the rear wheels 20.

Mounted on the chassis 12 are a cab 24 and a body enclosure, designated generally by the reference numeral 26. The body enclosure is preferably fully closed, and includes one or more access openings 28 through which refuse or the like may be introduced to the interior of the enclosure.

Figure 2:
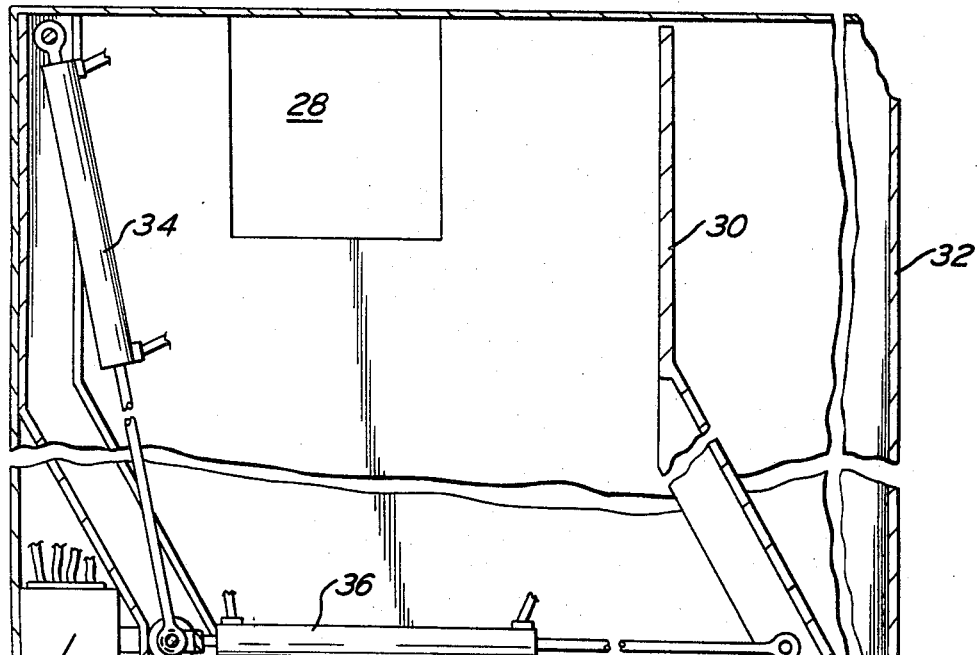
FIGURE 2 is a side elevational view of an exemplary hydraulic actuator means for a packer.

Within the body enclosure 26 is a packer of the type disclosed in greater detail in copending patent application Ser. No. 560,453, now Patent No. 3,419,166, assigned to the corporate assignee of the present invention. Briefly, the packer takes the form of a packer blade 30, movable toward a wall 32 of the enclosure 26. Hydraulic actuators, in the form of cylinders 34 and 36, are sequentially extended to move the packer blade 30 from the position shown in FIGURE 1 to that seen in FIGURE 2. A body hydraulic control valve 38 provides for metering of fluid to the hydraulic cylinders 34 and 36 in proper sequence. It should be understood that the illustrated forms of the packer blade 30 and the hydraulic cylinders 34 and 36 form no part of the present invention, and in fact, packer mechanisms of numerous well-known types may be employed.

Figure 3:
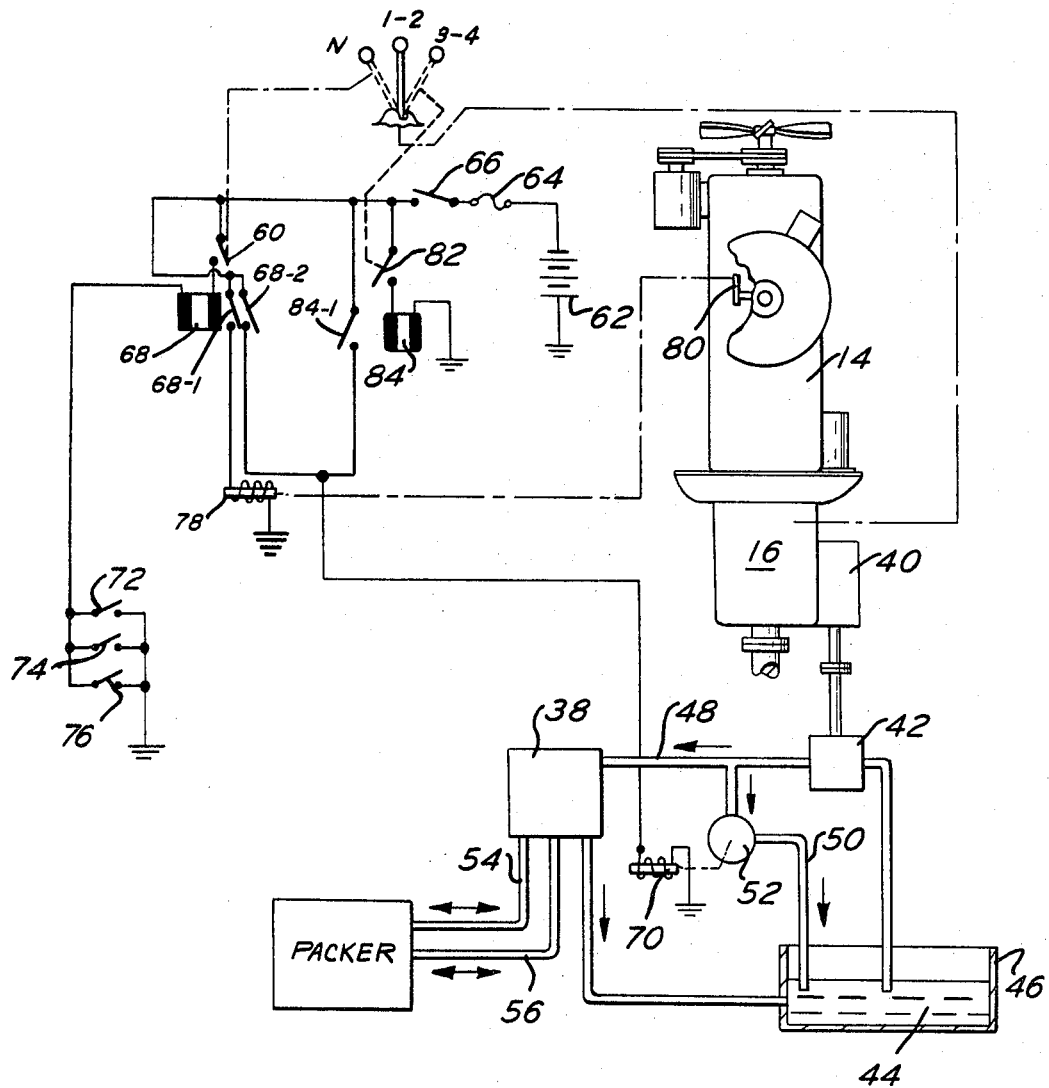
FIGURE 3 is a diagrammatic view showing the manner in which the packer of a vehicle in accordance with the present invention is provided with hydraulic pressure.

Referring now to FIGURE 3, a power take-off 40 is shown to be associated with the transmission 16. The power take-off 40 is coupled to those portions of the transmission 16 directly or mechanically linked to the crankshaft of the engine 14 and hence, is responsive to changes in engine speed. A hydraulic pump 42 is coupled to and driven by the power take-off 40. The pump 42 draws hydraulic fluid 44 from a reservoir 46, shown diagrammatically in the figure, and discharges to hydraulic conduit means 48, which includes a bypass or relief line 50. The bypass includes a normally open valve 52, the function of which will be explained later. The conduit means 48 is hydraulically coupled to the body hydraulic control valve 38, previously mentioned, and fluid is conducted from the control valve through an additional conduit 54 to the packer, shown in FIGURE 3 diagrammatically. The notation "Packer" in FIGURE 3 serves as a convenient shorthand for the hydraulic actuator means defined by cylinders 34 and 36, as well as the packer plate 30. A return conduit 56 is provided in the illustrative embodiment between the packer and the body hydraulic control valve 38, and a further return conduit joins the control valve 38 and the reservoir 46. With the valve 52 in its normally open position, hydraulic fluid circulates from the reservoir 46, through the pump 42, the valve 52 and the bypass 50. Closing of the valve 52 results in the application of working pressure to the packer body hydraulic control valve 38 and the packer.

Also seen in FIGURE 3 is the control apparatus for the valve 52, whereby selective operation of the packer is obtained, but damage to the hydraulic components due to excessive pressure is prevented.

It is often desired to operate the packer mechanism when the vehicle is at rest, that is, when the transmission 16 is in the neutral condition. To this end, a microswitch 60 is provided in association with the shift lever 17. Placing of the shift lever 17 in the neutral position, shown in dotted lines in FIGURE 3, causes closing of the microswitch 60. The operative association of the shift lever 17 and microswitch 60 is represented symbolically by a broken line in FIGURE 3. In an electrical circuit with the microswitch 60 are a source of electrical potential, such as the battery 62, a fuse 64, and a master switch 66. The master switch 66 is located within the cab 24 of the vehicle 10. Also in the circuit with the microswitch 60 are the coil of a relay 68, and a plurality of body-mounted manually operable switches 72, 74 and 76. Switches 72, 74 and 76 are in parallel with each other. The relay 68 includes relay contacts 68–1 and 68–2. The relay contact 68–2, as will now be explained, controls a solenoid actuator 70, coupled to the normally open valve 52. Actuation of the solenoid actuator 70 results in closing of the valve 52.

The solenoid actuator 70 is in a circuit comprising the relay contacts 68–2, the master switch 66 and the battery 62. Thus, selection of the neutral position of shift lever 17, when the master switch 66 is closed, enables actuation of the solenoid actuator 70 by closing of any of the body-mounted switches 72, 74 and 76. Actuation of one of the switches 72, 74 and 76, when the master switch 66 and microswitch 60 are closed, is thus effective to (1) complete the circuit through the coil of the relay 68, thereby causing closing of the relay contacts 68–2, and (2) thereby complete the circuit through the solenoid actuator 70 to close the valve 52. Thus, the switches 72, 74 and 76 are means whereby an operator may selectively apply motive force to the packer body hydraulic control valve 38 and the packer itself. The switches 72, 74 and 76 are preferably located at spaced points on the body enclosure 26 or chassis 12, to permit operation by an attendant outside the vehicle.

Another important aspect of the present invention is the manner in which the engine 14 is speeded up to provide adequate fluid pressure for operation of the packer when the transmission is in the neutral range. To accomplish this, a solenoid actuator 78 is provided in a circuit comprising the relay contact 68–1, the master switch 66 and battery 62. The solenoid actuator 78 is coupled to the controls of the engine 14, preferably the throttle linkage 80, shown diagrammatically in the drawing. Accordingly, closing of the master switch 66 with the transmission in neutral and actuation of one of the switches 72, 74 and 76 automatically results in engine speed-up through the operation of the solenoid actuator 78.

It will be appreciated that use of the solenoid actuator 78 to speed up the engine and pump 42 makes possible the use of a smaller pump, and minimizes the likelihood of hydraulic overload at any engine speed.

Movement of the shift lever 17 to the high range position closes a normally open microswitch 82. The operative association of the shift lever 17 and microswitch 82 is represented symbolically by a broken line in FIGURE 3. Connected in series with the microswitch 82 is the coil 84 of a relay. The microswitch 82 and relay coil 84 are in a circuit comprising the battery 62, fuse 64, and master switch 66. Thus, when the master switch 66 is closed, selection of the high range position of the shift lever 17 closes the circuit and causes current to flow through the relay coil 84. The contacts 84–1 associated with the relay coil 84 are in a circuit including the master switch 66 and battery 62, and also the above-described solenoid actuator 70. Accordingly, closing of the circuit through the relay coil 84 (1) causes closing of the contacts 84–1, and (2) thereby completes a circuit through the solenoid actuator 70 to close the valve 52.

It will be noted that no provision is made for the application of pressure to the packer hydraulic system when the shift lever is in the low range. The high engine speeds often attained when operation is limited to the low or "1–2" range present a serious risk of damage to the hydraulic components of the packer mechanism, and the elimination of such risk is an important advantage of the invention. With the shift lever 17 in the high range, upshift (and consequently reduction in engine speed) occurs before excessive engine speed causes excessive pressure in the hydraulic system. Use of the high range nevertheless permits operation of the system during movement of the vehicle, such as when enroute between pickup points. The present apparatus provides for operation of the packer when the vehicle is at rest or when in motion, and further, permits operation of the packer from outside of the vehicle when the vehicle is at rest, and from inside when it is in motion. Accordingly, the present apparatus permits maximum flexibility in its manner of operation, and minimum risk of damage to the various working parts of the hydraulic system.

We claim:

1. A vehicle having an engine, a transmission providing a plurality of selectable speed ranges coupled to said engine, drive means selectively coupled to said transmission and to the drive wheels of said vehicle, a body on said vehicle, a packer in said body for applying force to articles in said body, means coupled to said packer for actuating said packer, engine driven means for supplying motive force to said means for actuating said packer, control means coupled to said transmission and said means for supplying motive force, said control means including means responsive to selection of one of a predetermined plurality of said speed ranges of said transmission to enable application of motive force to said means for actuating said packer, and manually operable means whereby an operator may selectively apply motive force to said means for actuating said packer when said means responsive to selection of a speed range so enables.

2. A vehicle in accordance with claim 1 wherein said means for actuating said packer comprises hydraulic actuator means, said means for supplying motive force being a source of hydraulic pressure, said control means including a valve for applying hydraulic pressure to said hydraulic actuator means, and said manually operable means comprising means for operating said valve to apply hydraulic pressure to said hydraulic actuator means.

3. A vehicle in accordance with claim 2, and hydraulic conduit means coupling said source to said means for actuating said packer, a bypass in said hydraulic conduit means whereby fluid is normally diverted from said actuator means, said valve being a normally open valve in said bypass, said means responsive to the speed range of said transmission being coupled to said valve to close said valve responsive to selection of a speed range of said transmission.

4. A vehicle in accordance with claim 2 wherein said transmission includes at least two forward speed ranges and a neutral range, said means responsive to selection of a speed range of said transmission including switch means responsive to setting of said transmission in the neutral range so that said means for actuating said packer may be operated when said transmission is in the neutral range.

5. A vehicle in accordance with claim 4 wherein said forward speed ranges include a low range and high range, said means responsive to selection of a speed range of said transmission including switch means responsive to setting of the transmission in the high range so that said means for actuating said packer may be operated when said transmission is in said high range.

6. A vehicle in accordance with claim 4 wherein said engine includes speed control means, and means responsive to setting of the transmission in the neutral range coupled to said speed control means for increasing the speed of said engine when said transmission is in the neutral range and said manually operable means are operated so that said source provides hydraulic pressure sufficient to operate said hydraulic actuator means.

7. A vehicle in accordance with claim 6 wherein said forward speed ranges include a low range and a high range, said means responsive to the speed range of said transmission including switch means responsive to setting of the transmission in said high range so that said means for actuating said packer may be operated when said transmission is in said high range.

8. A vehicle in accordance with claim 7, and hydraulic conduit means coupling said source to said means for actuating said packer, a bypass in said hydraulic conduit means whereby fluid is normally diverted from said actuator means, said valve means being a normally open valve in said bypass, said switch means responsive to setting of the transmission in the neutral range and said switch means responsive to setting of the transmission in the high range being coupled to said valve to enable closing of said valve, and at least one manually operable means for effecting closing of said valve to operate said hydraulic actuator means.

9. In a vehicle having an engine, a transmission providing a plurality of selectable speed ranges coupled to said engine, a body, a packer in said body for applying force to articles in said body, means coupled to said packer for actuating said packer, and engine driven means for supplying motive force to said means for actuating said packer, control means coupled to said transmission and said means for supplying motive force, said control means including means responsive to selection of one of a predetermined plurality of said speed ranges of said transmission to enable selective application of motive force to said means for actuating said packer, said control means further including manually operable means whereby motive force may be applied to said means for actuating said packer when said means responsive to selection of a speed range of said transmission so enables.

References Cited

UNITED STATES PATENTS

| | | | |
|---|---|---|---|
| 2,557,003 | 6/1951 | Laurin | 214—82 |
| 2,808,158 | 10/1957 | Gilleo | 214—82 |
| 2,912,128 | 11/1959 | Kamin | 214—82 |
| 3,074,571 | 1/1963 | Dean | 214—82 |
| 3,110,406 | 11/1963 | Roth | 214—82 X |

GERALD M. FORLENZA, Primary Examiner

ROBERT J. SPAR, Assistant Examiner

U.S. Cl. X.R.

60—19, 52; 74—873; 91—459